No. 697,840. Patented Apr. 15, 1902.
J. H. R. HEAD.
CONSTRUCTION AND APPLICATION OF PISTON VALVES.
(Application filed Apr. 26, 1901.)
(No Model.)
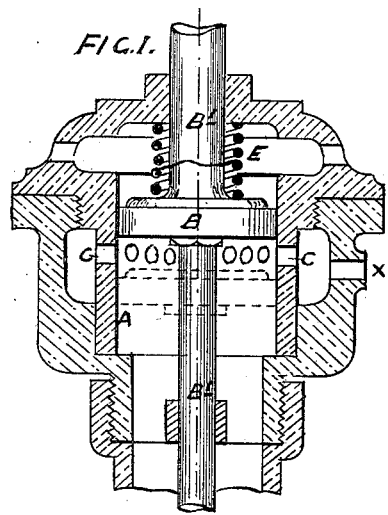
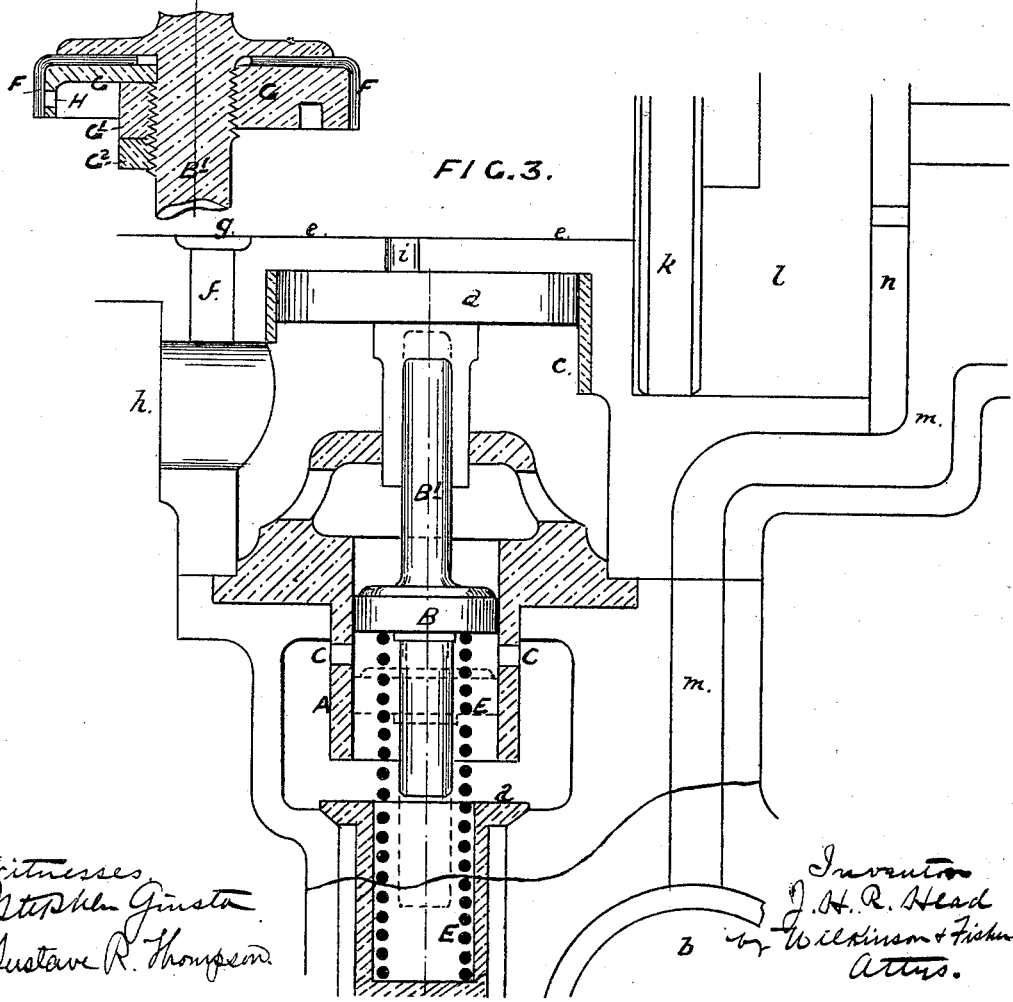

UNITED STATES PATENT OFFICE.

JOSEPH HENRY RENDER HEAD, OF SOUTH SHIELDS, ENGLAND.

CONSTRUCTION AND APPLICATION OF PISTON-VALVES.

SPECIFICATION forming part of Letters Patent No. 697,840, dated April 15, 1902.

Application filed April 26, 1901. Serial No. 57,655. (No model.)

*To all whom it may concern:*

Be it known that I, JOSEPH HENRY RENDER HEAD, a subject of the King of Great Britain and Ireland, and a resident of South Shields, in the county of Durham, England, have invented certain new and useful Improvements in the Construction and Application of Piston-Valves; and I do hereby declare the following to be a full, clear, and exact description of the invention, such as will enable others skilled in the art to which it appertains to make and use the same.

The objects of this invention are to obtain the many advantages of such valves, as perfect tightness against leakage of gases or fluids under pressure, the absence of friction, and consequently of wear, simplicity of construction and fitting, and non-liability to leakage by being fouled by grit and dirt getting on the seats of miter or similar direct-seating valves. Valves so constructed and applied are specially adapted for all cases where such advantages are of primary importance, as where there are many objections to other forms of valves, as miter or similar direct-seating valves. As they have been specially designed for pressure or vacuum brakes on railway-vehicles, I will so illustrate and describe them.

Figure 1 shows in sectional elevation a piston-valve sliding in a tube applicable alternatively for pressure and vacuum brakes, as the case may be, such as are adapted to enable an alarm to be sounded and the brakes gradually applied on an emergency by a passenger in any compartment of each carriage forming a train. Fig. 2 shows, enlarged for clearness, the piston, with one mode of packing it. Fig. 3 shows an illustration of their application to what is called the "quick-acting triple valve" of the Westinghouse brake system and replaces a direct-seating valve, with which great difficulty is found in keeping the faces free from leakage caused by being fouled by grit, dirt, or the like on their faces.

The figures all are about full natural size except Fig. 2, which is purposely enlarged; but only those parts are shown which are necessary to illustrate the piston-valve, its construction, and operation, the others being merely outlined.

Referring to Fig. 1, A is the tube in which the piston B slides to open or close the ports C through and around the tube as the piston is actuated by any suitable mechanism—as a cord or chain—by levers from any compartment, on either side of the compartment, by a passenger in case of emergency opening either the pressure or vacuum valve, as the case may be, and releasing the pressure or admitting the atmosphere through the ports C to destroy the vacuum, simultaneously sounding a whistle or gong at X to give an alarm-signal and gradually applying the brakes. The rod B' of the piston B works through guides and is furnished with a spring E, (shown shortened for want of space,) tending to return it to the closed position when the guard has set back the mechanism to its normal position. The full lines show the piston when the ports C admit air under pressure and the dotted lines when it has been moved downward to close the ports C to the atmosphere entering through the cover, as in the case of vacuum-valves. Fig. 1 shows a pressure-brake valve in which in its normal or closed position the piston B is as shown by dotted lines, the ports C being closed against the air entering below from the train-brake pipe; but the communication mechanism having been operated by a passenger in an emergency the piston moves into the position shown by full lines, causing the air to pass through the ports and into the atmosphere, sounding an alarm at the same time through a whistle or gong at X. With vacuum-brakes the positions are reversed, the piston being normally as in full lines and when operated having moved downward to the position shown by dotted lines, when air from the atmosphere enters through openings in the cover and passes through the ports C and downward through ports provided below (not shown) into the train-brake pipe, destroys the vacuum, sounds an alarm, and applies the brakes.

Fig. 2 shows an enlarged section of one of the pistons and showing on left-hand side one method of fixing the "cupped" valve, of leather or other suitable flexible material, and on the right-hand side another form of washer G. The cupped packing-leather F is kept in shape and tight by a cupped washer G, secured on the piston-rod by a nut G' and by a jam-nut $G^2$. This cupped washer G is in one case perforated all around by small holes H, by which the pressure of air has access to the back of the cupped packing-leather, so as to be pressed firmly against the inside of the tube A.

Referring now to Fig. 3, the drawing shows a piston-valve constructed according to my invention to exactly fit into the seat of the usual direct-seating valve, which is found very liable to leakage. A is the tube, with ports C; B, the piston sliding therein to open or close said ports and being packed with cupped leather. The piston-rod B' extends upward and is guided in a box formed on a piston above, which actuates it to open the ports C, and extends downward surrounded by a spring E, inclosed in a case, to return the piston to its normal position. This spring also controls the miter-valve $a$, which is in communication with the train-brake pipe by the cock $b$ when so operated. In a cylinder $c$, open at one end, is a piston $d$, to the top face of which air under pressure is admitted when a slide-valve on the face $e$ is moved into a certain position, and this valve also opens a port $f$, in communication with the auxiliary reservoir of air under high pressure, which enters at $g$ and passes to the brake-cylinder at $h$. At the same time the air from the reservoir enters the port $i$ above the piston in the cylinder $c$ and forces it down upon the piston-rod B', moving the piston, so as to open the ports C in the tube A, when the air under pressure passes through the ports and into the brake-cylinder at $h$, and the pressure on top of the miter-valve $a$ being thus relieved the valve opens, and air from the main brake-pipe also passes through to the brake-cylinder. When the brakes have been thus applied, the miter-valve $a$ closes by the action of its spring, and the piston B returns to its normal position, closing the ports C in the tube A. The slide-valve before named is actuated on its face, when quick action is required, by a piston $k$ in a cylinder $l$ by air from the main brake-pipe through the cock $b$ and by a passage $m$ behind the piston $k$ (through a perforated disk $n$) and is thus instantly moved the full stroke in its cylinder $l$, correspondingly moving the slide-valve to its full extent and applying the brakes, as described.

What I claim is—

1. In a valve mechanism, the combination with a perforated cylinder provided with an inlet and outlet for fluid under pressure, of a piston provided with a cupped packing-ring, a perforated cupped washer fitting in said packing-ring for admitting pressure behind said packing-ring, the said packing-ring having its free edge level with the top edge of the perforated washer to prevent buckling of the packing-ring when passing the perforations in said cylinder, and means for operating said piston for controlling the delivery of fluid under pressure through the perforations in said cylinder.

2. In a quick-acting valve mechanism, the combination with a supply-pipe, and a check-valve opening from said supply-pipe; of a perforated cylinder arranged in line with said check-valve, a piston in said cylinder adapted to pass over said perforations, a piston-rod extending both ways from said piston, a second cylinder in line with the first cylinder, and a second piston in said second cylinder, connected with the first piston, a spring pressing at one end upon the first piston and at the other end upon said check-valve, and means for admitting fluid under pressure, from said supply-pipe to the second cylinder and piston to operate the first piston, substantially as described.

3. In a quick-acting valve mechanism, the combination with a supply-pipe, and a check-valve opening from said supply-pipe; of a perforated cylinder arranged in line with said check-valve, a piston in said cylinder adapted to pass over said perforations, a packing-ring on said piston and means for admitting pressure behind said packing-ring, a piston-rod extending both ways from said piston, a second cylinder in line with the first cylinder, and a second piston in said second cylinder, connected with the first piston, a spring pressing at one end upon the first piston and at the other end upon said check-valve, and means for admitting fluid under pressure from said supply-pipe to the second cylinder and piston to operate the first piston, substantially as described.

JOSEPH HENRY RENDER HEAD.

Witnesses:
WILLIAM DAGGETT,
I. J. DANSON.